INVENTORS
ERNST FANGRADT
WINFRID WENZLAFF

AGENT

United States Patent Office 3,489,616
Patented Jan. 13, 1970

3,489,616
GALVANIC ATMOSPHERIC-OXYGEN CELL
Ernst Fangradt and Winfrid Wenzlaff, Berlin, Germany, assignors to VEB Berliner Akkumulatoren- und Elementefabrik, Berlin-Oberschoneweide, Germany
Filed Nov. 14, 1967, Ser. No. 682,882
Int. Cl. H01m 21/00, 11/00
U.S. Cl. 136—107                                10 Claims

ABSTRACT OF THE DISCLOSURE

Electrolytic cell, more particularly galvanic atmospheric-oxygen cell having a negative zinc electrode, a positive carbon electrode and an alkaline electrolyte therebetween, wherein a sub-assembly is formed in a thermoplastic, preferably polyethylene, sealing ring by superimposed sequential arrangement of the carbon electrode, a suction layer preferably made from absorbent paper, a metal cap preferably having at least one aeration aperture therein, and a thermoplastic, preferably polyethylene, cover foil.

The sealing ring has offset portions, a double metal cup being fitted partly outside and partly inside the sealing ring, with an absorbent cuff, preferably made of a gas-permeable cellulosic material, disposed between the sealing ring and the outer portion of the metal cup.

---

The invention relates to galvanic atmospheric-oxygen cells with alkaline electrolyte, generally termed electrolytic cells.

Galvanic atmospheric-oxygen cells with potash or soda lye as electrolyte are well known. The cells, however, have the disadvantage that carbon dioxide from the air can penetrate. Potassium carbonate resulting therefrom crystallizes out and obstructs the pores of the carbon electrode, rendering the cell useless. If the potassium carbonate remains in solution, the conductivity of the electrolyte is reduced, however. The access of $CO_2$ depends on the ratio between volume and surface of the cell.

For this reason, alkaline atmospheric-oxygen cells, especially with high capacity values, and atmospheric-oxygen cells with neutral salt solutions as electrolyte are manufactured down to the smallest structural units. The energy capacity of these cells is good at low loads. The load is limited by diffusion. Only when using expensive catalysts can the efficiency of the active carbon be increased. The alkaline atmospheric-oxygen cells present the further disadvantage that special measures must be taken in order that the electrolyte does not leak out.

To avoid damage due to leakage of electrolyte, a galvanic cell having a two-part container has become known in which there are arranged an anode and a cathode, and between them an immovable alkaline electrolyte and an annular packing of elastic insulating material whose flange engages between the opposite, outwardly curved annular marginal flanges of the container portions, and which presents a cuff portion which spans the marginal flange of the container portion.

An outer sleeve embraces with an annular edge the circumference of the cuff portion and holds the latter under radial pressure and the flange under axial pressure such that the container portions normally close tightly but upon occurrence of excessive gas pressure in the cell become axially displaced in relation to each other. The axial pressure on the flange thereby decreases and the radial pressure of the cuff portion increases in order thus to enable the gas to issue between the edge flange of the container portion and the cuff flange into the outer container and further, after passing through absorbent material, to the outside through an opening in the bottom of the outer container.

With this known galvanic cell having an anode of a depolarized material containing an electrolytically reducible, oxygen-yielding compound and an alkaline electrolyte, hermetic sealing of the cell can be obtained, and at prevailing excess pressure in the cell, the gas formed therein can escape to the outside through an excess-pressure valve.

This construction, however, is not feasible for a cell with activated oxygen electrode and alkaline electrolyte since for the operation of the cell the oxygen of the air serves as the depolarizer, and therefore the atmospheric air must have access to the carbon electrode in the interior of the cell, which is done preferably through aeration apertures.

In the case of these cells with atmospheric-oxygen depolarization, however, it is not possible to determine the moment at which the air supply of the atmosphere must set in, namely upon taking into operation and not earlier. As a major defect must be regarded also the fact that the preferred disc shape of the carbon electrode is difficult to carry out because of its instability.

In view of the above-mentioned disadvantages, the problem underlying the invention is to provide a relatively heavily chargeable galvanic atmospheric-oxygen cell or electrolytic cell with alkaline electrolyte which permits keeping the harmful influence of the carbon dioxide of the atmosphere away from the electrolyte to a large extent, and protecting the carbon electrode from diffusion through of the electrolyte by a rapidly responding valve action, as well as preventing the leakage of the electrolyte entrained by the gas escaping to the outside at excess pressure, and finally allowing the access of atmospheric air only upon taking the cell into operation.

According to the invention, the problem is solved in that a disc-shaped carbon electrode is used in the inventive electrolytic cell having an alkaline electrolyte, the end face of which is covered with a perforated metal cap which carries on the outside a cover foil and encloses by the inner side a suction layer lying on the carbon electrode and made of absorbent paper. The electrode is so extrusion-coated with a packing ring that an intimate electrolyte-proof connection exists between the surface area of the carbon electrode and the packing ring, and hence after the cell is set in operation by removal of the cover foil and clearance of the access of atmospheric air, the cell becomes active only from the face covered with the metal cap, and the alkaline electrolyte contained in the electrolyte-absorbing separator cannot penetrate between the carbon electrode and the packing ring.

Further characteristics of the invention consist in that a zinc electrode of pressed zinc powder, which is accommodated in the interior of two metal cups conductively interconnected for example by spot welding, encloses the electrolyte between it and the carbon electrode in the packing ring, the outer surface of the inner metal cup and the inner surface of the outer metal cup applying closely against the packing ring and embracing a cuff of absorbent material. The latter preferably consists of absorbent gas-permeable cellulosic material.

At the points of application of the inner and outer metal cups, the packing ring is provided with fine axial longitudinal grooves, whereby a rapidly responding valve action is achieved. If during operation or charging an intensified evolution of gas occurs in the cell, the gas escapes through the fine longitudinal grooves between the inner metal cup and the packing ring into the zone lined with the absorbent cuff. There the gas is freed from adhering electrolyte particles by absorption and passes through the fine longitudinal grooves between the packing ring and the outer metal cup into the atmosphere.

By proper design of the fine axial longitudinal grooves and selection of the absorbent material the sensitivity of the valve action is determined and the leakage of the gas through the absorbent cuff initiated at so low an excess pressure that penetration of the carbon electrode with the electrolyte can practically not occur.

In case electrolyte is forced through the carbon electrode with the gas, the suction layer is provided for absorption of the electrolyte, which prevents the leakage of electrolyte through the aeration apertures to the outside and hence among other things the corrosion of the contact area when the cover foil is removed. Before taking into operation, during storage of the cell, leakage of electrolyte through the aeration apertures is not possible at all as the cover foil seals the apertures.

All structural elements of the cell can be produced automatically by mass-production methods and can be assembled to structural units; it is thus possible to provide automatic production methods, including final assembly and electrical testing. By extruding or surrounding the mechanically unstable carbon electrode with the packing ring, made from a thermoplastic material such as, for example, polyethylene, a mechanically stable structural unit or subassembly is provided which is easy to assemble. or sub-assembly is provided which is easy to assemble. The cover foil included in the extrusion of the packing ring and covering the aeration apertures insures storage of the cell for a prolonged time.

The various objects, features and attendant advantages of the present invention will become more apparent from the following description of a preferred, exemplary embodiment of the inventive electrolytic cell when considered in conjunction with the accompanying drawing, wherein FIG. 1 is a cross-sectional view of the galvanic atmospheric-oxygen cell according to the invention, in completely assembled condition;

Figure 1:
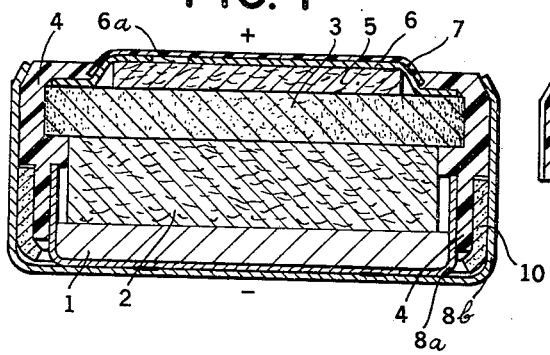
Figure 2:
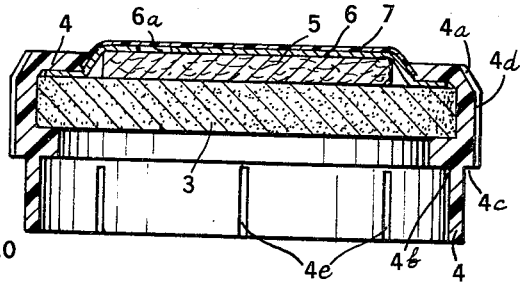
FIG. 2 is a similar cross-sectional view of the sealing or packing ring forming a sub-assembly with some of the structural parts of the cell, before complete assembly.

With reference to the drawing, and particularly the assembled view in FIG. 1 of the inventive electrolytic cell, the basic components are a zinc electrode 1 of pressed zinc powder, and an oxygen-permeable carbon electrode 3 between which an electrolyte-absorbing separator 2 is arranged, carrying the alkaline electrolyte. As a matter of example, the electrolyte preferably consists of a 40% potash lye with 5% zinc oxide. The carbon electrode 3 with a suction layer 5, a metal cap 6 and a cover foil 7 are extruded in a leak-proof manner together with a sealing or packing ring 4, thus forming the subassembly as shown in FIG. 2.

The zinc electrode 1 is contained in the interior of two interconnected metal cups 8a, 8b which are slipped over internally and externally offset open sides 4b, 4c of the ring 4 and enclose an absorbent cuff 10. The cuff consists preferably of an absorbent, gas-permeable cellulosic material. It fills the radial space between the outer offset 4c of the ring and the inside of the outer cup 8b (see FIG. 1).

Figure 4:
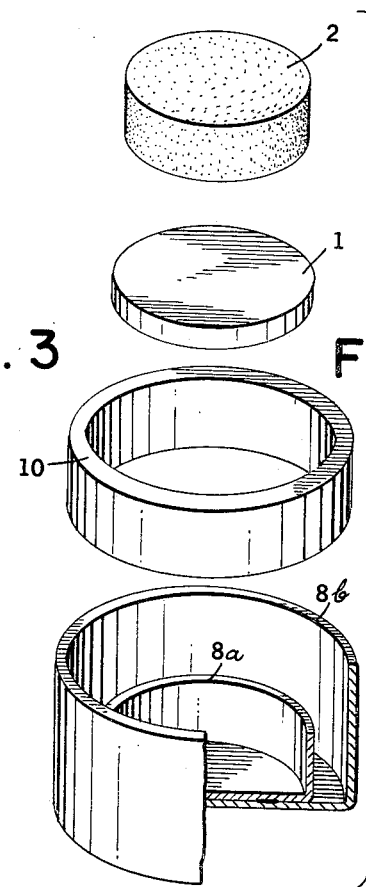
FIG. 4 is a similar exploded perspective view of the remaining parts, not appearing in FIG. 3, and constituting therewith the assembled electrolytic cell (as shown in FIG. 1).

The metal cup portions 8a, 8b are concentric and are firmly interconnected at the bottom, e.g. by welding, and they form a radial gap or clearance (see FIG. 4, bottom). The zinc electrode 1 arranged in the inner metal cup 8a consists of pressed zinc powder. It may be mentioned at this point that, in a preferred, exemplary design of the inventive electrolytic cell, the overall measurements are 15 millimeters height and 30 millimeters diameter.

During assembly, the outer edge of the outer metal cup 8b is easily placed around a facet 4a of the sealing ring 4 for attachment, as shown in FIG. 1. A comparison of the lower portion of FIG. 4 with FIG. 1 will show how the originally straight outer edge has been flanged about the facet 4a of the ring, thereby immobilizing the sub-assembly of FIG. 2 within the metal cup 8b.

Figure 3:
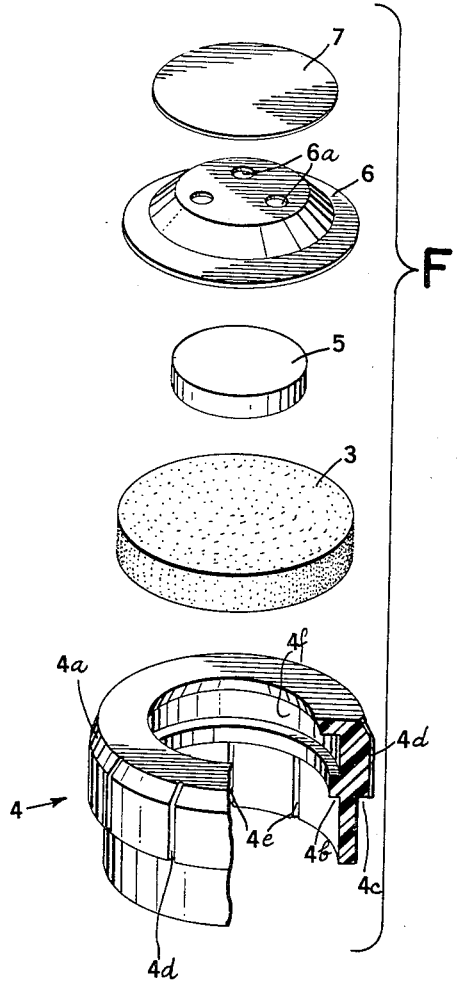
FIG. 3 is an exploded perspective view of the structural parts forming the sub-assembly of FIG. 2.

The carbon electrode 3, the metal cap 6 and the cover foil 7 are arranged one above the other and are connected at their edges, during the extrusion of the sealing ring 4, in an electrolyte-proof manner. In the free space between the carbon electrode 3 and the metal cap 6 is enclosed the aforementioned suction layer 5. The metal cap 6 is shown in FIGS. 1 to 3 as having aeration apertures 6a. It will be understood that the cap serves at the same time for aeration and for making contact, constituting the positive pole of the electrolytic cell after the protective foil 7 has been removed when activating the cell. The cup 8a, 8b constitutes the negative pole of the cell.

Sealing ring 4 and cover foil 7 consist of a thermoplastic material and are fused together during the extrusion process along peripheral portions of the foil 7 so that the aeration apertures 6a in the metal cap 6 are covered in a gas- and air-proof way.

Carbon electrode 3 and metal cap 6 are pressed together by their contact faces by the thermoplastic sealing ring 4 so strongly that a reliable electric contact is ensured.

By the extrusion joining of carbon electrode 3 and covering cap 6 with the ring 4, the electrode 3 which in itself is mechanically unstable can be treated or handled without any otherwise necessary stiffening, for example metal gauze or other metal inserts, without being damaged. Thus a mechanically stable sub-assembly (FIG. 2) is obtained which is suitable for a mechanized, automatic assembly of the electrolytic cell.

As mentioned before, the sealing ring 4 is offset inside at 4b and outside at 4c, and presents fine axial longitudinal grooves 4d and 4e on respective outer upper and inner lower surfaces, as shown in the perspective bottom portion of FIG. 3. The purpose of these grooves will be explained hereafter.

If during operation or storage an intensified evolution of gas occurs in the electrolytic cell according to the invention, the gas flows through the fine longitudinal grooves 4e between the inner metal cup 8a and the ring 4 into the space filled with the absorbent cuff 10. As it passes through this cuff, the gas is freed from the adhering electrolyte particles by absorption and now escapes through the fine longitudinal grooves 4d between the ring 4 and the outer metal cup 8b into the atmosphere.

In FIG. 1, a small circumferential clearance is shown about the separator 2 which is adapted to take up some of the evolved gas. From here, any excess pressure will drive the gas, as has been described hereinbefore, around the top edge of the inner metal cup 8a, at the offset 4b of ring 4, then in downward direction, as viewed in the drawing, along the inner grooves 4e of the ring 4, about the lowermost edge of the ring 4, and thence into the absorbent cuff 10. After having discharged the adhering electrolyte particles, the gas is allowed to escape, in an upwardly direction, by way of the outer grooves 4d of ring 4, between the topmost edge of the outer metal cup 8b and the upper surface of the ring.

The proper number, length and cross section of the fine longitudinal grooves 4d, 4e are established by experiment to achieve the required valve action, that is, so to adjust or determine the response point of this valve system, serving not to let the electrolyte pass through the carbon electrode 3, that at an intensified evolution of gas it must first take its way in the described manner along the grooves 4d, 4e and the cuff 10, and therefore a penetration of the carbon electrode 3 with the electrolyte can practically not occur.

As experiments have shown, the selection of the absorbent material for the cuff 10 with respect to the valve action is not without signficance as it offers a certain resistance to the flowing gas.

For the case that electrolyte is nevertheless forced through the carbon electrodes 3 with the gas, the suction layer 5 for the absorption of the electrolyte is provided, which prevents the leakage of electrolyte through the aeration apertures 6a in the metal cap 6 to the outside and hence, among other things, corrosion of the contact area when the cover foil 7 is removed.

Cuffs of absorbent material, e.g. kraft paper, etc., to be used in the production of galvanic cells of this type, are generally known. Without the provision of an absorbent cuff as shown at 10 the above-mentioned valve action would be almost ineffective.

The metal cap 6 constitutes the positive pole of the cell, as mentioned before, and the metal cup 8b is the negative pole. In production, the cap 6, which presents the aeration apertures 6a, is covered with the foil 7 which serves for their hermetic sealing. When taking the cell in to use, the cover foil 7 must be cut open, scratched away or removed entirely (e.g. by tearing along an inner edge of the upper sealing-ring surface) so that atmospheric oxygen is given access and the cell can become operative. With the removal of the cover foil 7, also the positive pole (the cap 6) is exposed for electric contact.

As a matter of example, it should be noted that the usual operating voltage of the inventive electrolytic cell amounts to 1.3 volts at 3 ampere-hours capacity.

It has been mentioned before that the carbon electrode 3 is mechanically unstable. Proper support may be provided in that the carbon electrode 3 is surrounded by the sealing ring 4, is positioned in an annular clearance of said ring and is held on three sides, as shown in FIG. 1 as well as in the bottom portion of FIG. 3 at 4f. The plastic ring 4 is preferably extruded or molded around the electrode 3. This of course lends stability to the otherwise porous and brittle electrode, also positioning the same between the suction layer 5 and the separator 2 which is pushed into the sub-assembly (FIG. 2) in a subsequent phase of the assembly.

The foregoing disclosure relates only to a preferred, exemplary embodiment of the inventive electrolytic cell, which is intended to include all changes and modifications, as well as additions to the example described and illustrated, which are within the spirit and scope of the invention as set forth in the objects, inventive features expounded in the preamble, and in the appended claims.

What we claim is:

1. A galvanic atmospheric-oxygen cell comprising a zinc electrode and a carbon electrode, an alkaline electrolyte being disposed therebetween, a suction layer, a metal cap, and a cover foil in sequential superimposed arrangement with said carbon electrode, a sealing ring disposed therearound in an electrolyte-proof manner, the above elements forming a sub-assembly, said sealing ring having at least on one of its inner and outer sides an offset portion, and further comprising a metal cup and having an inner and an outer portion defining a radial clearance between said inner and outer portions, a portion of said sealing ring, and an absorbent cuff, being disposed in said clearance adjacent said portion of the sealing ring.

2. The galvanic cell as defined in claim 1, further comprising a separator interposed between said zinc and said carbon electrodes, retained in a recess of said sealing ring, for containing said electrolyte.

3. The galvanic cell as defined in claim 1, wherein said sealing ring is made from a thermoplastic material such as polyethylene.

4. The galvanic cell as defined in claim 1, wherein said metal cap has at least one aeration aperture therein, and said cover foil is made of a thermoplastic material covering said aeration apertures.

5. The galvanic cell as defined in claim 4, wherein said sealing ring is made from the same thermoplastic material as said cover foil, peripheral portions thereof being fused with each other so that said cover foil provides a gas- and air-tight seal for said aeration apertures.

6. The galvanic cell as defined in claim 1, wherein said suction layer consists of absorbent paper.

7. The galvanic cell as defined in claim 1, wherein said cuff is made of an electrolyte absorbent gas-permeable cellulosic material.

8. The galvanic cell as defined in claim 1, wherein said sealing ring is provided with fine axial longitudinal grooves in the areas making contact with said inner and said outer portions of the metal cup.

9. The galvanic cell as defined in claim 8, further comprising valve means preventing said electrolyte from penetrating into said carbon electrode, and providing an escape path for excessive gas development by way of said absorbent cuff and said grooves in the sealing ring.

10. The galvanic cell as defined in claim 8, wherein said sealing ring is provided with an inner, substantially annular clearance accommodating said carbon electrode which by itself is mechanically unstable, said carbon electrode being positioned between said suction layer forming part of said sub-assembly and a separator containing said electrolyte, which is pushed into the lower portion of said sealing ring in a subsequent phase of the assembly.

References Cited

UNITED STATES PATENTS

| | | | |
|---|---|---|---|
| 2,636,062 | 4/1953 | Colton | 136—133 |
| 2,816,153 | 12/1957 | Kort | 136—107 |
| 2,822,416 | 2/1958 | Parkinson | 136—107 |
| 3,205,097 | 9/1965 | Clune et al. | 136—102 |

WINSTON A. DOUGLAS, Primary Examiner

A. SKAPARS, Assistant Examiner

U.S. Cl. X.R.

136—111, 133, 163, 179